United States Patent
Alt et al.

(10) Patent No.: US 7,196,152 B2
(45) Date of Patent: Mar. 27, 2007

(54) MODIFIED ZIEGLER CATALYST, PROCESS FOR PREPARING IT AND PROCESS FOR PREPARING POLY-1-OLEFINS IN ITS PRESENCE

(75) Inventors: Frank Alt, Frankfurt (DE); Ludwig Böhm, Hattersheim (DE); Friedhelm Gundert, Liederbach (DE)

(73) Assignee: Basell Polyolefine GmbH, Frankfurt (DE)

( * ) Notice: Subject to any disclaimer, the term of this patent is extended or adjusted under 35 U.S.C. 154(b) by 0 days.

(21) Appl. No.: 10/523,775

(22) PCT Filed: Jul. 31, 2003

(86) PCT No.: PCT/EP03/08472

§ 371 (c)(1),
(2), (4) Date: Mar. 17, 2005

(87) PCT Pub. No.: WO2004/018529

PCT Pub. Date: Mar. 4, 2004

(65) Prior Publication Data

US 2005/0261123 A1    Nov. 24, 2005

Related U.S. Application Data

(60) Provisional application No. 60/408,199, filed on Sep. 4, 2002.

(30) Foreign Application Priority Data

Aug. 9, 2002  (DE) ............................... 102 36 647

(51) Int. Cl.
  *C08F 210/00*  (2006.01)
(52) U.S. Cl. .................. 526/348; 526/348; 526/124.1; 526/124.2; 526/124.3; 526/123.1; 526/126; 502/103; 502/104; 502/115
(58) Field of Classification Search ................ 526/348, 526/124.1, 124.2, 124.3, 123.1, 126; 502/103, 502/104, 115
See application file for complete search history.

(56) References Cited

U.S. PATENT DOCUMENTS 3,644,318 A    2/1972  Diedrich et al.
4,255,544 A    3/1981  Kimura et al.
5,354,820 A   10/1994  Funabashi
5,610,246 A *  3/1997  Buehler et al. ............. 526/119
5,917,100 A    6/1999  Bohm et al.
6,320,003 B1  11/2001  Nishimura et al.
6,337,376 B1   1/2002  Naito et al.

FOREIGN PATENT DOCUMENTS

| EP | 0 223 011 | 5/1987 |
|---|---|---|
| EP | 0 319 173 | 6/1989 |
| EP | 0 522 424 | 1/1993 |
| EP | 0 522 424 A2 * | 1/1993 |
| EP | 0 532 551 | 3/1993 |
| EP | 0582943 | 2/1994 |
| EP | 0 607 773 | 7/1994 |
| EP | 0773240 | 5/1997 |
| IE | 911881 | 12/1991 |
| JP | 05 301921 | * 11/1993 |
| WO | WO-01/38405 | 5/2001 |

* cited by examiner

*Primary Examiner*—Ling-Sui Choi
(74) *Attorney, Agent, or Firm*—Connolly Bove Lodge & Hutz LLP

(57) ABSTRACT

The invention relates to a modified Ziegler catalyst for preparing a poly-1-olefin in suspension, in solution or in the gas phase, which catalyst comprises the reaction product of a magnesium alkoxide (component a) with a transition metal compound (component b) and an organometallic compound (component c) together with an additional component (d) comprising a compound of the chemical formula $$M\text{-}R_x$$

where M is an element of main group IV of the Periodic Table, R is halogen or an organic radical such as alkyl having from 1 to 10 carbon atoms, oxyalkyl having from 1 to 10 carbon atoms, cycloalkyl having from 4 to 8 carbon atoms in the ring and, if desired, from 1 to 6 substituents R' on the ring, aryl having from 6 to 10 carbon atoms in the aromatic and, if desired, from 1 to 6 substituents R' on the aromatic, where R' is a halogen or an alkyl radical having from 1 to 4 carbon atoms or an OH group or an $NO_2$ group or an oxyalkyl radical having from 1 to 4 carbon atoms, and x is an integer from 1 to 4. The invention also relates to a process for preparing the Ziegler catalyst and to the homopolymerization or copolymerization of 1-olefins in its presence.

20 Claims, No Drawings

MODIFIED ZIEGLER CATALYST, PROCESS FOR PREPARING IT AND PROCESS FOR PREPARING POLY-1-OLEFINS IN ITS PRESENCE

This application is a national stage application (under 35 U.S.C. 371) of PCT/EP2003/08472 filed on Jul. 31, 2003 which claims benefit to German application serial no DE 102 36 647.0 filed Aug. 9, 2002 and United States provisional application number 60/408,199 filed Sep. 4, 2002.

Description

Modified Ziegler catalyst, process for preparing it and process for preparing a poly-1-olefin in its presence The invention relates to a chemically modified Ziegler catalyst and to a process for preparing poly-1-olefins in its presence.

Magnesium alkoxides $Mg(OR^1)(OR^2)$ or "complex" magnesium alkoxides can be reacted with compounds of titanium, zirconium, vanadium or chromium to give solids which together with organometallic compounds of group 1, 2 or 13 of the Periodic Table (the groups are printed, for example, in the Handbook of Chemistry and Physics, $76^{th}$ edition (1995–1996)) to form excellent catalysts for olefin polymerization.

A process for the polymerization of 1-olefins in the presence of a mixed catalyst whose component (a) has been prepared by reaction of magnesium alkoxides with tetravalent, halogen-containing titanium compounds is known (cf. U.S. Pat. No. 3,644,318). The magnesium alkoxides are used in the form in which they are commercially available. The polymers obtainable by this process possess a relatively narrow molar mass distribution.

Also known is a process for preparing a Ziegler catalyst, in which a dissolved magnesium alkoxide is reacted with a halogen-containing Ti or V compound and a transition metal alkoxide (cf. EP-A 319 173). The catalyst particles formed in this process are spherical and have a mean particle size of from 10 to 70 μm.

Finally, it is also known that a product of the reaction of a tetravalent, halogen-containing titanium compound with a magnesium alkoxide in which at least 40% by weight of particles have a diameter of less than 63 μm can be used as transition metal component (cf. EP-A 223 011). A magnesium alkoxide having this particle size is obtained, for example, by milling a commercial product in a ball mill. The magnesium alkoxide is used as a suspension in an inert hydrocarbon.

It has also been stated in EP-A 532 551 that Ziegler catalysts which have a high to very high activity and enable the particle size distribution of the polymer to be controlled are obtained when the magnesium alkoxide is used as a gel-like dispersion. This gel-like dispersion is obtained by suspending the commercial magnesium alkoxide in an inert hydrocarbon and dispersing this suspension under protective gas (Ar, $N_2$) in a dispersing unit having a high-power shear tool (e.g. ®Ultra-Turrax or ®Dispax, IKA-Maschinenbau Janke & Kunkel GmbH, or ®Supraton, Krupp-Buckau, Germany) for a period of a number of hours or days while cooling strongly.

Furthermore, WO 01/38405 states that Ziegler catalysts having a very high activity are obtained when the magnesium alkoxide is used as a gel-like dispersion but the starting material is subjected beforehand to dry milling in a mill under inert conditions, which results in particular economic advantages in the preparation of the catalyst.

In the preparation of monomodal, bimodal or multimodel PE products in a cascaded or batch suspension polymerization (STHD), it is advantageous for the process and the properties of the products prepared therewith for the low molar mass polymer formed with the aid of the catalyst under specifically selected reaction conditions to have a very steep flank on the low molecular weight side of the molar mass distribution, and this should preferably be steeper than that of the prior art.

A steeper flank on the low molecular weight side of the molar mass distribution is equivalent to a low formation of low molecular weight wax, which is dissolved in the suspension medium in the suspension polymerization. When less wax is formed in the polymerization, less wax has to be discharged from the process in the industrial preparation of PE, which improves the economics of the process because the costs for energy and disposal are lower. In addition, an amount of monomeric ethylene corresponding to the amount of wax not formed is converted into PE product, so that the product yield of the process increases and the economics of the production process are further improved.

It is therefore an object of the present invention to find a Ziegler catalyst which is the reaction product of a magnesium alkoxide dispersion with a transition metal compound and an organometallic compound, with the catalyst being chemically modified so that the polymerization of 1-olefins in its presence gives a product which contains a significantly smaller amount of wax than in the prior art and thus has a steep flank on the low molecular weight side of the molar mass distribution, namely a flank which is steeper than in the prior art.

This object is achieved by a Ziegler catalyst for preparing 1-olefin homopolymers and copolymers by polymerization of a 1-olefin of the formula $R^4CH=CH_2$, where $R^4$ is hydrogen or an alkyl radical having from 1 to 10 carbon atoms, in suspension, in solution or in the gas phase, which catalyst comprises the reaction product of a magnesium alkoxide (component a) with a transition metal compound (component b) and an organometallic compound (component c) together with an additional component (d) comprising a compound of the chemical formula

where M is an element of main group IV of the Periodic Table, R is halogen or an organic radical such as alkyl having from 1 to 10 carbon atoms, oxyalkyl having from 1 to 10 carbon atoms, cycloalkyl having from 4 to 8 carbon atoms in the ring and, if desired, from 1 to 6 substituents R' on the ring, aryl having from 6 to 10 carbon atoms in the aromatic and, if desired, from 1 to 6 substituents R' on the aromatic, where R' is a halogen or an alkyl radical having from 1 to 4 carbon atoms or an OH group or an $NO_2$ group or an oxyalkyl radical having from 1 to 4 carbon atoms, and x is an integer from 1 to 4.

According to the invention, the radicals R do not have to be identical, but instead it is possible to combine various types of radical R with one another. According to the invention, the element of main group IV of the Periodic Table is preferably silicon or germanium.

As component (a), it is possible to use a commercially available magnesium alkoxide. This magnesium alkoxide can be a magnesium alkoxide of the formula $Mg(OR^1)(OR^2)$, where $R^1$ and $R^2$ are identical or different and are each an alkyl radical having from 1 to 6 carbon atoms. Examples are $Mg(OCH_3)_2$, $Mg(OC_2H_5)_2$, $Mg(OiC_3H_7)_2$, $Mg(OnC_4H_9)_2$, $Mg(OCH_3)(OC_2H_5)$, $Mg(OC_2H_5)$ (OnC$_3$H$_7$). It is also possible to use a magnesium alkoxide of the formula Mg(OR)$_n$X$_m$, where X=halogen, (SO$_4$)$_{1/2}$, OH, (CO$_3$)$_{1/2}$, (PO$_4$)$_{1/3}$ or Cl, R is as defined above for R$^1$ or R$^2$ and n+m=2.

However, it is also possible to use a magnesium alkoxide which comprises not only magnesium but at least one further metal of group 1, 2, 13 or 14 of the Periodic Table. Examples of such a magnesium alkoxide are:
[Mg(OiC$_3$H$_7$)$_4$]Li$_2$; [Al$_2$(OiC$_3$H$_7$)$_8$]Mg; [Si(OC$_2$H$_5$)$_6$]Mg; [Mg(OC$_2$H$_5$)$_3$]Na; [Al$_2$(OiC$_4$H$_9$)$_8$]Mg; [Al$_2$(O-secC$_4$H$_9$)$_6$(OC$_2$H$_5$)$_2$]Mg.

Preference is given to using Mg(OC$_2$H$_5$)$_2$, Mg(OnC$_3$H$_7$)$_2$ or Mg(OiC$_3$H$_7$)$_2$. The magnesium alkoxide is used in pure form.

Commercial Mg(OC$_2$H$_5$)$_2$ generally has the following specification:

| | |
|---|---|
| Mg content | 21–22% by weight |
| MgCO$_3$ | ≦1% by weight |
| C$_2$H$_5$OH content | <0.3% by weight |

The mean particle diameter is 400–700 μm, with at least 90% of the particles having a particle diameter in the range from 200 to 1200 μm.

Inert hydrocarbons which are suitable for the purpose of the invention are aliphatic or cycloaliphatic hydrocarbons such as butane, pentane, hexane, heptane, isooctane, cyclohexane, methylcyclohexane, and also aromatic hydrocarbons such as toluene, xylene; hydrogenated diesel oil or petroleum spirit fractions which have carefully been freed of oxygen, sulfur compounds and moisture can also be used.

It may be advantageous, but is not absolutely necessary for the purposes of the process of the invention, for a suspension of the commercial magnesium alkoxide powder used as component (a) in an inert hydrocarbon in which the magnesium alkoxide is insoluble to be converted by stirring with a stirrer or shearing with a high-power shearing tool into a gel-like dispersion of the magnesium alkoxide which, at the same ratio of initially charged solid to hydrocarbon, expressed as percent by mass, and at the same temperature displays slower settling of the solid and a higher proportion by volume of the solid in the dispersion after complete settling of the solid, expressed as percent by volume, than the initial suspension of the commercial magnesium alkoxide powder in the same inert hydrocarbon.

A gel-like dispersion of this type can also be prepared by stirring a suspension of a previously milled magnesium alkoxide powder in an inert hydrocarbon in which the magnesium alkoxide is insoluble by means of a stirrer in a vessel which has been made inert, or shearing it by means of a high-power shearing tool, with the same mean number of particles being present in each volume increment of the mixture.

To prepare the Ziegler catalyst, the dispersion or suspension of the component (a) can then be reacted in one step or in a plurality of steps with the component (b), viz. a transition metal compound such as a Ti compound (TiCl$_4$, Ti(OR)$_4$, etc.), a Zr compound (Zr(OR)$_4$, ZrCl$_2$(OCOC$_6$H$_5$)$_2$, etc.), a V compound (VCl$_4$, VOCl$_3$, etc.) or a chromium compound (CrO$_2$Cl$_2$, etc.).

The component (a) is reacted with the transition metal compound at a temperature in the range from 20 to 100° C., preferably from 60 to 90° C., in the presence of an inert hydrocarbon while stirring at a stirrer speed appropriate to requirements. From 0.05 to 5 mol of transition metal compound, preferably from 0.1 to 3.5 mol, are used per 1 mol of magnesium alkoxide. The reaction time is from 0.5 to 8 hours, preferably from 2 to 6 hours.

In addition to or subsequent to the reaction of the component (a) with the component (b), the reaction product can be treated with a suspension or a solution of the component (d) in an inert solvent. In a preferred embodiment of the invention, the component (d) has a chemical composition in which the radical R is a chlorine or bromine atom or an alkyl radical having from 1 to 6 carbon atoms, preferably from 1 to 4 carbon atoms, an oxyalkyl radical having from 1 to 6 carbon atoms, preferably from 1 to 4 carbon atoms, a cycloalkyl radical having 5 or 6 carbon atoms or a phenyl radical.

The treatment is carried out at a temperature in the range from 20 to 120° C., preferably from 60 to 100° C., for a time in the range from 0.1 to 8 hours, preferably from 2 to 6 hours, using an amount of from 0.05 to 5 mol of component (d) per mol of magnesium alkoxide, preferably from 0.1 to 3.5 mol.

This gives, as reaction product, a solid which comprises magnesium, transition metal and element M and is insoluble in hydrocarbons and forms a suspension (solid/liquid) with the inert hydrocarbon.

The preparation of the polymerization catalyst to be used according to the invention is carried out by combining the reaction product with component (c), viz. an organometallic compound of a metal of group 1, 2 or 13 of the Periodic Table. The reaction product of component (a), (b) and (d) can be reacted directly as a suspension with the component (c).

As component (c), preference is given to using organoaluminum compounds. Suitable organoaluminum compounds are chlorine-containing organoaluminum compounds, e.g. dialkylaluminum monochlorides of the formula R$^3$$_2$AlCl or alkylaluminum sesquichlorides of the formula R$^3$$_3$Al$_2$Cl$_3$, where R$^3$ is an alkyl radical having from 1 to 16 carbon atoms. Examples which may be mentioned are (C$_2$H$_5$)$_2$AlCl, (iC$_4$H$_9$)$_2$AlCl, (C$_2$H$_5$)$_3$Al$_2$Cl$_3$. It is also possible to use mixtures of these compounds.

The order in which the components (a), (b), (c) and (d) are combined to form the Ziegler catalyst can, according to the present invention, be varied. Thus, the components (b), (c) and (d) can be added in succession to component (a), but it is equally possible to introduce the components (b), (d) and (c) in succession or introduce the components (b) and (d) as a mixture and then component (c), with the component (d) also being able, if desired, to be introduced as external donor during the polymerization.

The reaction product of the components (a), (b), (c) and (d) is the Ziegler catalyst, but it still has to be converted into an active system by means of an organoaluminum compound as cocatalyst. Compounds suitable as cocatalyst include chlorine-free organoaluminum compounds such as aluminum trialkyls AlR$^3$$_3$ or dialkylaluminum hydrides of the formula AlR$^3$$_2$H, where R$^3$ is an alkyl radical having from 1 to 16 carbon atoms. Examples are Al(C$_2$H$_5$)$_3$, Al(C$_2$H$_5$)$_2$H, Al(C$_3$H$_7$)$_3$, Al(C$_3$H$_7$)$_2$H, Al(iC$_4$H$_9$)$_3$, Al(iC$_4$H$_9$)$_2$H, Al(C$_8$H$_{17}$)$_3$, Al(C$_{12}$H$_{25}$)$_3$, Al(C$_2$H$_5$)(C$_{12}$H$_{25}$)$_2$, Al(iC$_4$H$_9$)(C$_{12}$H$_{25}$)$_2$.

Mixtures of organometallic compounds of metals of group 1, 2 or 13 of the Periodic Table, in particular mixtures of various organoaluminum compounds, can also be used as cocatalyst.

Mixtures which may be mentioned by way of example are:

Al(C$_2$H$_5$)$_3$ and Al(iC$_4$H$_9$)$_3$, Al(C$_2$H$_5$)$_2$Cl and Al(C$_8$H$_{17}$)$_3$, Al(C$_2$H$_5$)$_3$ and Al(C$_8$H$_{17}$)$_3$, Al(C$_4$H$_9$)$_2$H and Al(C$_8$H$_{17}$)$_3$, Al(iC$_4$H$_9$)$_3$ and Al(C$_8$H$_{17}$)$_3$, Al(C$_2$H$_5$)$_3$ and Al(C$_{12}$H$_{25}$)$_3$, Al(iC$_4$H$_9$)$_3$ and Al(C$_{12}$H$_{25}$)$_3$, Al(C$_2$H$_5$)$_3$ and Al(C$_{16}$H$_{33}$)$_3$, Al(C$_3$H$_7$)$_3$ and Al(C$_{18}$H$_{37}$)$_2$(iC$_4$H$_9$), Al(C$_2$H$_5$)$_3$ and isoprenylaluminum (=reaction product of isoprene with Al(iC$_4$H$_9$)$_3$ or Al(iC$_4$H$_9$)$_2$H).

Mixing of catalyst and cocatalyst can be carried out prior to the polymerization in a stirred vessel at a temperature in the range from −30 to +150° C., preferably from −10 to +120° C. However, it is also possible to combine catalyst and cocatalyst directly in the polymerization vessel at a temperature in the range from 20 to 200° C. The addition of the cocatalyst can also be carried out in two steps, by preactivating the catalyst of the invention with a first part of the cocatalyst at a temperature in the range from −30 to 150° C. prior to the polymerization reaction and adding a further part of the same cocatalyst or a different cocatalyst in the polymerization reactor at a temperature in the range from 20 to 200° C.

The polymerization catalyst to be used according to the invention (Ziegler catalyst) is used for the polymerization of 1-olefins of the formula R$^4$—CH=CH$_2$, where R$^4$ is a hydrogen atom or an alkyl radical having from 1 to 10 carbon atoms, for example ethylene, propylene, 1-butene, 1-hexene, 4-methyl-1-pentene or 1-octene.

Preference is given to polymerizing ethylene alone or in a mixture of at least 50% by weight of ethylene and not more than 50% by weight of another 1-olefin of the above formula.

In particular, ethylene is polymerized-alone or as a mixture of at least 90% by weight of ethylene and not more than 10% by weight of another 1-olefin of the above formula.

The polymerization is carried out in a known manner in solution, in suspension or in the gas phase, continuously or batchwise, in one or more stages at a temperature of from 20 to 200° C., preferably from 50 to 150° C. The pressure is from 0.5 to 50 bar. Preference is given to carrying out the polymerization in the industrially particularly interesting pressure range of from 1.5 to 30 bar.

The catalyst of the invention is used in a concentration, based on transition metal, of from 0.0001 to 1 mmol, preferably from 0.001 to 0.5 mmol of transition metal per dm$^3$ of dispersion medium. However, high concentrations are also possible in principle.

The suspension polymerization is carried out in an inert dispersion medium customary for the Ziegler low-pressure process, for example in an aliphatic or cycloaliphatic hydrocarbon such as butane, pentane, hexane, heptane, isooctane, cyclohexane or methylcyclohexane. Furthermore, it is possible to use petroleum fractions or hydrogenated diesel oil fractions which have carefully been freed of oxygen, sulfur compounds and moisture.

Both suspension polymerization and gas-phase polymerization can be carried out directly or after prepolymerization of the catalyst, with the prepolymerization advantageously being carried out by the suspension process.

The molar mass of the polymer is regulated in a known manner, preferably using hydrogen.

As a consequence of the high activity of the catalyst of the invention, the process of the invention gives polymers which have a very low transition metal and halogen content and therefore give extremely good values in color stability and corrosion tests.

Furthermore, the process of the invention makes it possible to modify the catalysts so that the proportions of wax in the polymer produced are decreased, so that a narrower molar mass distribution expressed by the ratio M$_w$/M$_n$ is achieved, with, in particular, a very steep flank on the low molecular weight side of the molar mass distribution contributing to this narrowing.

The invention is illustrated by means of the examples described below.

The reported results on the elemental composition of the catalysts described were obtained by the following analytical methods:

Ti: photometrically by means of the peroxide complex

Mg, Cl, Al: titrimetrically by customary methods

Si: by means of ICP-OES (Inductively Coupled Plasma Optical Spectral Analysis) in accordance with DIN EN ISO11885

The product properties of the polymer powders reported in the tables have been determined by the following methods:

VN (viscosity number): in accordance with DIN EN ISO 1628-3

Bulk density: in accordance with DIN EN ISO 60 d$_{50}$ (mean particle diameter): in accordance with DIN 53477 and DIN66144

M$_w$/M$_n$ (polydispersity): measure of the width of the molar mass distribution (M$_w$=weight average, M$_n$=number average), which is determined by the GPC method in accordance with DIN55672. The measurements were carried out at 135° C. in trichlorobenzene as solvent.

M<1E3g/mol: proportion by weight of molecules having a molar mass below 1000 g/mol, which is employed as a measure of the proportion of wax formed. This is determined from the integrated molecular weight distribution curve obtained using the GPC method.

EXAMPLE 1

(According to the Invention)

In a 2 dm$^3$ stirred vessel provided with reflux condenser, 2-blade blade stirrer and inert gas blanketing (Ar), a suspension of 57 g of commercial Mg(OC$_2$H$_5$)$_2$ which had been milled to a mean particle diameter of about 5 μm in an opposed-jet mill model 100 AFG from Hosokawa Alpine AG, Augsburg/Germany at a throughput of about 6 kg/h in 1.0 dm$^3$ of diesel oil having a boiling range of 140–170° C. (hydrogenated petroleum fraction) was stirred at a temperature of 85° C. for 20 hours at a stirrer speed of 100 rpm (revolutions per minute).

The time taken for the resulting gel-like Mg(OC$_2$H$_5$)$_2$ dispersion to settle at room temperature after switching off the stirrer was about 60 minutes.

0.4 dm$^3$ (containing 23 g of Mg(OC$_2$H$_5$)$_2$) of the gel-like dispersion was transferred to a 1 dm$^3$ stirred vessel provided with reflux condenser, 2-blade blade stirrer and inert gas blanketing (Ar), and 0.1 dm$^3$ of diesel oil having a boiling range of 140–170° C. (hydrogenated petroleum fraction) was added. The mixture was then heated to 85° C. while stirring at a stirrer speed of 125 rpm and 0.04 mol of TiCl$_4$ in 10 cm$^3$ of diesel oil (hydrogenated petroleum fraction having a boiling range of 140–170° C.) was subsequently metered in over a period of 4 hours. After an after-reaction time of 0.5 hour, 0.02 mol of SiCl$_4$ in 10 cm$^3$ of diesel oil (hydrogenated petroleum fraction having a boiling range of 140–170° C.) was metered in as silane component over a period of 4 hours. After an after-reaction time of 0.5 hour, the mixture was heated to 110° C. 0.175 mol of Al$_2$(C$_2$H$_5$)$_3$Cl$_3$ in 200 cm$^3$ of diesel oil (hydrogenated petroleum fraction having a boiling range of 140–170° C.) was added over a period of 2 hours while stirring at a stirrer speed of 250 rpm. The temperature was subsequently held at 110° C. for a further 2 hours.

The suspension of the solid was cooled to room temperature. The molar ratio of the solid was: Mg:Ti:Al:Cl≈1:0.21: 0.16:2.36.

Comparative Example 1

The preparation of the catalyst was carried out by the method described in Example 1 except that no silane compound was added.

The suspension of the solid was cooled to room temperature. The molar ratio of the solid was: Mg:Ti:Al:Cl≈1:0.21: 0.33:2.25.

EXAMPLE 2

(According to the Invention)

Example 2 describes the use of the catalyst component prepared as described in Example 1 for the polymerization of ethylene.

The polymerization experiments were carried out batchwise in a 200 dm$^3$ reactor. This reactor was equipped with an impeller stirrer and baffles. The temperature in the reactor was measured and kept constant automatically. The polymerization temperature was 85±1° C.

The polymerization reaction was carried out in the following way: 100 dm$^3$ of diesel oil (hydrogenated petroleum fraction having a boiling range of 140–170° C.) were introduced into the N$_2$-blanketed reactor and heated to 85° C. Under a blanket of inert gas (N$_2$), the cocatalyst (Al (C$_2$H$_5$)$_3$) was added in such an amount that the cocatalyst concentration in the reactor was 0.50 mmol/dm$^3$. The catalyst prepared as described in Example 1 was then introduced into the reactor as a suspension diluted with diesel oil in an amount corresponding to 3.0 mmol of titanium.

The reactor was pressurized a number of times to 8 bar with H$_2$ (hydrogen) and depressurized again each time in order to remove the nitrogen completely from the reactor (the procedure was monitored by measuring the H$_2$ concentration in the gas space of the reactor, which finally gave a result of 95% by volume). The polymerization was started by opening the ethylene inlet. Ethylene was fed in at a rate of 4.0 kg/h over the entire polymerization time, with the pressure in the reactor slowly rising. The hydrogen content in the gas space of the reactor was measured continually and the proportion by volume was kept constant by metering in appropriate amounts of hydrogen (% by volume of H$_2$=80).

The polymerization was stopped after 300 minutes (20 kg of ethylene introduced) and the total pressure was read off. The contents of the reactor were drained onto a filter. The polymer which was moist with diesel oil was dried in a stream of nitrogen for a number of hours.

The results of the polymerization are shown below in Table 1.

Comparative Example 2

Comparative Example 2 describes the use of the catalyst component prepared as described in Comparative Example 1 for the polymerization of ethylene. The polymerization is carried out as described in Example 2.

The results of the polymerization are shown below in Table 1.

TABLE 1

Polymerization experiments using 200 dm$^3$ reactor, 50 mmol of triethylaluminum, 3.0 mmol of Ti (catalyst), 100 dm$^3$ of diesel oil, 4.0 kg/h of ethylene, polymerization temperature of 85° C., polymerization time of 300 minutes, 80% by volume of hydrogen in the gas space

| | Polymerization experiment | |
|---|---|---|
| | Ex. 2 | Comp. Ex. 2 |
| Catalyst component as described in | Ex. 1 | Comp. Ex. 1 |
| Final pressure/bar | 6.426 | 6.498 |
| Yield of PE/kg | 19.8 | 19.8 |
| VN/cm$^3$/g | 52 | 55 |
| Bulk density/g/l | 379 | 357 |
| d$_{50}$/μm | 165 | 154 |
| M$_w$/M$_n$ | 4.0 | 5.7 |
| M < 1E3 g/mol/[% by weight] | 5.5 | 8.5 |

It can clearly be seen from the values in Table 1 that the process of the invention advantageously achieves a decrease in the proportion of wax in the polymer, measured by the proportion of molecules smaller than 1000 g/mol, compared to the comparative example. At the same time, the molar mass distribution becomes narrower.

EXAMPLE 3

(According to the Invention)

103 g of commerical Mg(OC$_2$H$_5$)$_2$ were suspended in diesel oil (hydrogenated petroleum fraction having a boiling range of 140–170° C.) (total volume: 1.0 dm$^3$). The suspension was converted into a dispersion in a cylindrical glass vessel under inert gas (Ar) to exclude moisture and air (O$_2$) using a high-speed stirrer (®Ultra-Turrax) with external cooling by means of an ice bath (time: about 8 hours). The dispersion had a gel-like consistency.

0.28 dm$^3$ (containing 29 g of Mg(OC$_2$H$_5$)$_2$) of the gel-like dispersion was transferred to a 1 dm$^3$ stirred vessel provided with reflux condenser, 2-blade blade stirrer and inert gas blanketing (Ar), and 0.32 dm$^3$ of diesel oil having a boiling range of 140–170° C. (hydrogenated petroleum fraction) was added and the mixture was stirred at room temperature for 10 minutes at a stirrer speed of 100 rpm.

The time taken for the gel-like dispersion to settle at room temperature after the stirrer had been switched off was about 7 hours.

This gel-like dispersion was brought to 85° C. while stirring at a stirrer speed of 125 rpm and 0.05 mol of TiCl$_4$ in 100 cm$^3$ of diesel oil (hydrogenated petroleum fraction having a boiling range of 140–170° C.) was subsequently metered in over a period of 4 hours. After an after-reaction time of 0.5 hour, 0.025 mol of SiCl$_4$ in 100 cm$^3$ of diesel oil (hydrogenated petroleum fraction having a boiling range of 140–170° C.) was added as silane component over a period of 4 hours. After an after-reaction time of 0.5 hour, the mixture was heated to 110° C. 0.175 mol of Al$_2$(C$_2$H$_5$)$_3$Cl$_3$ in 200 cm$^3$ of diesel oil (hydrogenated petroleum fraction having a boiling range of 140–170° C.) was metered in over a period of 2 hours while stirring at a stirrer speed of 250 rpm. The temperature was subsequently held at 110° C. for a further 2 hours.

The suspension of the solid was cooled to room temperature. The molar ratio of the solid was: Mg:Ti:Si:Al:Cl≈1: 0.20:0.06:0.11:2.25.

EXAMPLE 4

(According to the Invention)

The preparation of the catalyst was carried out by the method described in Example 3 except that $TiCl_4$ and the silane component $SiCl_4$ were metered in together in 100 cm³ diesel oil (hydrogenated petroleum fraction having a boiling range of 140–170° C.) over a period of 4 hours.

The suspension of solid was cooled to room temperature. The molar ratio of the solid was: Mg:Ti:Si:Al:Cl≈1:0.20:0.07:0.15:2.30.

EXAMPLE 5

(According to the Invention)

The preparation of the catalyst was carried out by the method described in Example 3 except that 1.5 times the molar amount of $TiCl_4$ was added and the introduction of 0.025 mol of $SiCl_4$ in 100 cm³ diesel oil (hydrogenated petroleum fraction having a boiling range of 140–170° C.) as silane component was carried out only in the last step after the addition of $Al_2(C_2H_5)_3Cl_3$. The addition was carried out at 85° C. over a period of 2 hours, and an after-reaction time of 2 hours was employed.

The suspension of solid was cooled to room temperature. The molar ratio of the solid was: Mg:Ti:Si:Al:Cl≈1:0.30:0.02:0.16:2.53.

Comparative Example 3

The preparation of the catalyst was carried out by the method described in Example 3 except that no silane compound was added.

The suspension of solid was cooled to room temperature. The molar ratio of the solid was: Mg:Ti:Al:Cl≈1:0.20:0.25:2.15.

Comparative Example 4

The preparation of the catalyst was carried out by the method described in Example 3 except that 1.5 times the molar amount of $TiCl_4$ was added and no silane compound was added.

The suspension of solid was cooled to room temperature. The molar ratio of the solid was: Mg:Ti:Al:Cl≈1:0.32:0.20:2.5.

EXAMPLE 6

(According to the Invention)

Example 6 describes the use of the catalyst component prepared as described in Example 3 for the polymerization of ethylene. The polymerization was carried out as described in Example 2 except that the polymerization was stopped after 440 minutes (30 kg of ethylene introduced).

The results of the polymerization are shown below in Table 2.

EXAMPLE 7

(According to the Invention)

Example 7 describes the use of the catalyst component prepared as described in Example 4 for the polymerization of ethylene. The polymerization was carried out as described in Example 2 except that the polymerization was stopped after 220 min (15 kg of ethylene introduced).

The results of the polymerization are shown below in Table 2.

EXAMPLE 8

(According to the Invention)

Example 8 describes the use of the catalyst component prepared as described in Example 5 for the polymerization of ethylene. The polymerization was carried out as described in Example 2 except that the catalyst was added in an amount corresponding to 5.0 mmol of titanium, the ethylene was metered in at 8 kg/h, the proportion by volume of hydrogen was kept constant at 85% by volume and the polymerization was stopped after 220 minutes (30 kg of ethylene introduced).

The results of the polymerization are shown below in Table 2.

Comparative Example 5

Comparative Example 5 describes the use of the catalyst component prepared as described in Comparative Example 3 for the polymerization of ethylene. The polymerization was carried out as described in Example 2 except that the catalyst was added in an amount corresponding to 5.0 mmol of titanium, the ethylene was metered in at 8 kg/h, the proportion by volume of hydrogen was kept constant at 85% by volume and the polymerization was stopped after 220 minutes (30 kg of ethylene introduced).

The results of the polymerization are shown below in Table 2.

Comparative Example 6

Comparative Example 6 describes the use of the catalyst component prepared as described in Comparative Example 4 for the polymerization of ethylene. The polymerization was carried out as described in Example 2 except that the polymerization was stopped after 440 minutes (30 kg of ethylene introduced).

The results of the polymerization are shown below in Table 2.

Comparative Example 7

Comparative Example 7 describes the use of the catalyst component prepared as described in Comparative Example 4 for the polymerization of ethylene. The polymerization was carried out as described in Example 2 except that the polymerization was stopped after 220 minutes (15 kg of ethylene introduced).

The results of the polymerization are shown below in Table 2.

Comparative Example 8

Comparative Example 8 describes the use of the catalyst component prepared as described in Comparative Example 4 in the polymerization of ethylene. The polymerization was carried out as described in Example 2 except that the catalyst was added in an amount corresponding to 5.0 mmol of titanium, the ethylene was metered in at 8 kg/h, the proportion by volume of hydrogen was kept-constant at 85% by volume and the polymerization was stopped after 220 minutes (15 kg of ethylene introduced).

The results of the polymerization are shown below in Table 2.

It can clearly be seen from the values in Table 2 that, under identical polymerization conditions, the proportion of wax in the polymer, measured by the proportion of molecules smaller than 1000 g/mol, is advantageously lower in the examples carried out by the process of the invention than in the comparative examples.

EXAMPLE 9

(According to the Invention)

The preparation of the catalyst was carried out by the method described in Example 3 except that 1.5 times the molar amount of $TiCl_4$ was added and the introduction of 0.05 mol of dimethoxydiphenylsilane in 100 cm$^3$ of diesel oil (hydrogenated petroleum fraction having a boiling range of 140–170° C.) as silane component was carried out only in the last step after the addition of $Al_2(C_2H_5)_3Cl_3$. The addition was carried out at 110° C. over a period of 1 hour and an after-reaction time of 0.5 hour was employed.

The suspension of solid was cooled to room temperature. The molar ratio of the solid was: Mg:Ti:Si:Al:Cl≈1:0.32:0.01:0.17:2.43.

EXAMPLE 10

(According to the Invention)

The preparation of the catalyst was carried out by the method described in Example 3 except that 1.5 times the molar amount of $TiCl_4$ was added and the introduction of 0.05 mol of diethoxydiethylsilane in 100 cm$^3$ of diesel oil (hydrogenated petroleum fraction having a boiling range of 140–170° C.) as silane component was carried out only in the last step after the addition of $Al_2(C_2H_5)_3Cl_3$. The addition was carried out at 110° C. over a period of 1 hour and an after-reaction time of 0.5 hour was employed.

The suspension of solid was cooled to room temperature. The molar ratio of the solid was: Mg:Ti:Si:Al:Cl≈1:0.32:0.08:0.17:2.43.

EXAMPLE 11

(According to the Invention)

The preparation of the catalyst was carried out by the method described in Example 3 except that 1.5 times the molar amount of $TiCl_4$ was added and the introduction of 0.05 mol of dimethoxydiisobutylsilane in 100 cm$^3$ of diesel oil (hydrogenated petroleum fraction having a boiling range of 140–170° C.) as silane component was carried out only in the last step after the addition of $Al_2(C_2H_5)_3Cl_3$. The addition was carried out at 110° C. over a period of 1 hour and an after-reaction time of 0.5 hour was employed.

The suspension of solid was cooled to room temperature. The molar ratio of the solid was: Mg:Ti:Si:Al:Cl≈1:0.36:0.01:0.16:2.85.

EXAMPLE 12

(According to the Invention)

The preparation of the catalyst was carried out by the method described in Example 3 except that 1.5 times the molar amount of $TiCl_4$ was added and the introduction of 0.05 mol of dimethoxydicyclopentylsilane in 100 cm$^3$ of diesel oil (hydrogenated petroleum fraction having a boiling range of 140–170° C.) as silane component was carried out only in the last step after the addition of $Al_2(C_2H_5)_3Cl_3$. The addition was carried out at 110° C. over a period of 1 hour and an after-reaction time of 0.5 hour was employed.

The suspension of solid was cooled to room temperature. The molar ratio of the solid was: Mg:Ti:Si:Al:Cl≈1:0.32:0.01:0.11:2.44.

EXAMPLE 13

(According to the Invention)

The preparation of the catalyst was carried out by the method described in Example 3 except that 1.5 times the molar amount of $TiCl_4$ was added and the introduction of 0.05 mol of diethoxydimethylsilane in 100 cm$^3$ of diesel oil (hydrogenated petroleum fraction having a boiling range of 140–170° C.) as silane component was carried out only in the last step after the addition of $Al_2(C_2H_5)_3Cl_3$. The addition was carried out at 110° C. over a period of 1 hour and an after-reaction time of 0.5 hour was employed.

The suspension of solid was cooled to room temperature. The molar ratio of the solid was: Mg:Ti:Si:Al:Cl≈1:0.32:0.15:0.09:2.48.

Comparative Example 9

The preparation of the catalyst was carried out by the method described in Example 3 except that 1.5 times the molar amount of $TiCl_4$ was added and no silane compound was added. In addition, the catalyst was prepolymerized with 0.4 g of polyethylene per g of solid.

The solid suspension was cooled to room temperature. The molar ratio of the solid was: Mg:Ti:Cl≈1:0.32:2.5.

EXAMPLE 14

(According to the Invention)

Example 14 describes the use of the catalyst component prepared as described in Example 9 in the polymerization of ethylene.

A 1.5 dm$^3$ reactor was charged with 800 cm$^3$ of diesel oil (hydrogenated petroleum fraction having a boiling range of 140–170° C.). The reactor was then heated to 85° C. and, under a blanket of nitrogen, 2 mmol of triethylaluminum as cocatalyst and then the catalyst prepared as described in Example 9 in an amount corresponding to 0.045 mmol of titanium as a suspension diluted with diesel oil were introduced into the reactor. The reactor was then pressurized with 5 bar of hydrogen and 2 bar of ethylene. The total pressure of 7 bar was kept constant during the polymerization time of 2 hours by introducing further ethylene to replace that which had been consumed. The polymerization was stopped by venting of the gases and the polymer was separated from the dispersion medium by filtration and was dried.

The results of the polymerization are shown below in Table 3.

EXAMPLE 15

(According to the Invention)

Example 15 describes the use of the catalyst component prepared as described in Example 10 in the polymerization of ethylene. The polymerization was carried out as described in Example 14.

The results of the polymerization are shown below in Table 3.

EXAMPLE 16

(According to the Invention)

Example 16 describes the use of the catalyst component prepared as described in Example 11 in the polymerization of ethylene. The polymerization was carried out as described in Example 14.

The results of the polymerization are shown below in Table 3.

EXAMPLE 17

(According to the Invention)

Example 17 describes the use of the catalyst component prepared as described in Example 12 in the polymerization of ethylene. The polymerization was carried out as described in Example 14.

The results of the polymerization are shown below in Table 3.

EXAMPLE 18

(According to the Invention)

Example 18 describes the use of the catalyst component prepared as described in Example 13 in the polymerization of ethylene. The polymerization was carried out as described in Example 14.

The results of the polymerization are shown below in Table 3.

Comparative Example 10

Comparative Example 10 describes the use of the catalyst component prepared as described in Comparative Example 9 in the polymerization of ethylene. The polymerization was carried out as described in Example 14.

The results of the polymerization are shown below in Table 3.

It can clearly be seen from the values in Table 3 that the proportion of wax in the polymer measured by the proportion of molecules smaller than 1000 g/mol, is advantageously lower in the experiments carried out by the process of the invention than in the comparative example. At the same time, the molar mass distribution becomes narrower.

EXAMPLE 19

(According to the Invention)

Example 19 describes the use of the catalyst component prepared as described in Comparative Example 9 in the polymerization of ethylene. The polymerization was carried out as described in Example 14 except that 0.068 mmol of dimethoxydiphenylsilane (DMDPS) as external donor were introduced in addition to 2 mmol of triethylaluminum as cocatalyst.

The results of the polymerization are shown below in Table 4.

EXAMPLE 20

(According to the Invention)

Example 20 describes the use of the catalyst component prepared as described in Comparative Example 9 in the polymerization of ethylene. The polymerization was carried out as described in Example 14 except that 0.068 mmol of diethoxydiethylsilane (DEDES) was introduced as external donor in addition to 2 mmol of triethylaluminum as cocatalyst.

The results of the polymerization are shown below in Table 4.

EXAMPLE 21

(According to the Invention)

Example 21 describes the use of the catalyst component prepared as described in Comparative Example 9 in the polymerization of ethylene. The polymerization was carried out as described in Example 14 except that 0.068 mmol of dimethoxydiisobutylsilane (DMDiBS) were introduced as external donor in addition to 2 mmol of triethylaluminum as cocatalyst.

The results of the polymerization are shown below in Table 4.

EXAMPLE 22

(According to the Invention)

Example 22 describes the use of the catalyst component prepared as described in Comparative Example 9 in the polymerization of ethylene. The polymerization was carried out as described in Example 14 except that 0.068 mmol of dimethoxydicyclopentylsilane (DMDcPS) was introduced as external donor in addition to 2 mmol of triethylaluminum as cocatalyst.

The results of the polymerization are shown below in Table 4.

EXAMPLE 23

(According to the Invention)

Example 23 describes the use of the catalyst component prepared as described in Comparative Example 9 in the polymerization of ethylene. The polymerization was carried out as described in Example 14 except that 0.068 mmol of tetraethoxysilane (TES) was introduced as external donor in addition to 2 mmol of triethylaluminum as cocatalyst.

The results of the polymerization are shown below in Table 4.

It can clearly be seen from the values in Table 4 that the proportion of wax in the polymer, measured by the proportion of molecules smaller than 1000 g/mol, is advantageously lower in the examples carried out by the process of the invention than in the comparative example. At the same time, the molar mass distribution becomes narrower.

TABLE 2

Polymerization experiments using 200 dm³ reactor, 50 mmol of triethylaluminum, 100 dm³ of diesel oil and a polymerization temperature of 85° C.

| | Polymerization experiment | | | | | | |
|---|---|---|---|---|---|---|---|
| | Ex. 6 | Ex. 7 | Ex. 8 | Comp. Ex. 5 | Comp. Ex. 6 | Comp. Ex. 7 | Comp. Ex. 8 |
| Catalyst component as described in | Ex. 3 | Ex. 4 | Ex. 5 | Comp. Ex. 3 | Comp. Ex. 4 | Comp. Ex. 4 | Comp. Ex. 4 |
| Amount of catalyst/mmol of titanium | 3 | 3 | 5 | 5 | 3 | 3 | 5 |
| Rate of introduction of C2/kg/h | 4 | 4 | 8 | 8 | 4 | 4 | 8 |
| Proportion by volume of H2/% by volume | 80 | 80 | 85 | 85 | 80 | 80 | 85 |
| Polymerization time/min | 440 | 220 | 220 | 220 | 440 | 220 | 220 |
| Final pressure/bar | 5.964 | 4.128 | 4.752 | 7.008 | 7.194 | 4.206 | 5.838 |
| Yield of PE/kg | 29.3 | 15.0 | 29.8 | 30.6 | 29.7 | 14.9 | 29.4 |
| VN/cm³/g | 58 | 93 | 83 | 95 | 68 | 92 | 77 |
| Bulk density/g/l | 360 | 288 | 357 | 300 | 370 | 334 | 368 |
| $d_{50}/\mu m$ | 286 | 246 | 170 | 206 | 227 | 181 | 187 |
| $M_w/M_n$ | 6.2 | 6.3 | 5.1 | 7.1 | 7.2 | 8.3 | 6.1 |
| M < 1E3 g/mol/[% by weight] | 2.5 | 1.7 | 2.3 | 2.7 | 3.8 | 3.5 | 3.5 |

TABLE 3

Polymerization experiments using 1.5 dm³ reactor, 2 mmol of triethylaluminum, 0.045 mmol of titanium (catalyst), 0.8 dm³ of diesel oil, a polymerization temperature of 85° C., 5 bar of $H_2$, 2 bar of $C_2$ (7 bar total pressure) and a polymerization time of 2 h

| | Polymerization experiment | | | | | |
|---|---|---|---|---|---|---|
| | Ex. 14 | Ex. 15 | Ex. 16 | Ex. 17 | Ex. 18 | Comp. Ex. 10 |
| Catalyst component as described in | Ex. 9 | Ex. 10 | Ex. 11 | Ex. 12 | Ex. 13 | Comp. Ex. 9 |
| Yield of PE/g | 76.5 | 68.1 | 36.1 | 28.5 | 43.3 | 122.3 |
| VN/cm³/g | 85 | 95 | 77 | 74 | 76 | 81 |
| Bulk density/g/l | 285 | 267 | 280 | 292 | 275 | 297 |
| $M_w/M_n$ | 4.4 | 4.6 | 3.8 | 3.9 | 3.8 | 5.2 |
| M < 1E3 g/mol/[% by weight] | 0.96 | 1.16 | 0.96 | 1.31 | 0.77 | 1.79 |

TABLE 4

Polymerization experiments using 1.5 dm³ reactor, 2 mmol of triethylaluminum, 0.068 mmol of external donor, 0.045 mmol of titanium (catalyst), 0.8 dm³ of diesel oil, a polymerization temperature of 85° C., 5 bar of $H_2$, 2 bar of $C_2$ (7 bar total pressure) and a polymerization time of 2 h

| | Polymerization experiment | | | | | |
|---|---|---|---|---|---|---|
| | Ex. 19 | Ex. 20 | Ex. 21 | Ex. 22 | Ex. 23 | Comp. Ex. 10 |
| Catalyst component as described in | Comp. Ex. 9 | Comp. Ex. 9 | Comp. Ex. 9 | Comp. Ex. 9 | Comp. Ex. 9 | Comp. Ex. 9 |
| External donor | DMDPS | DEDES | DMDiBS | DMDcPS | TES | — |
| Yield of PE/g | 53.7 | 48.8 | 56.2 | 27.5 | 72.4 | 122.3 |
| VN/cm³/g | 80 | 66 | 85 | 79 | 83 | 81 |
| Bulk density/g/l | 265 | 256 | 256 | — | 258 | 297 |
| $M_w/M_n$ | 4.7 | 4.2 | 3.9 | 3.7 | 4.3 | 5.2 |
| M < 1E3 g/mol/[% by weight] | 1.11 | 0.79 | 0.38 | 0.43 | 0.78 | 1.79 |

The invention claimed is:

1. A Ziegler catalyst for preparing 1-olefin homopolymers and copolymers by polymerization of a 1-olefin of the formula $R^4CH=CH_2$, where $R^4$ is hydrogen or an alkyl radical having from 1 to 10 carbon atoms, in suspension, in solution or in the gas phase, which catalyst consists essentially of the reaction product of a magnesium alkoxide (component a) with a titanium compound (component b) and a chlorine-containing organoaluminum compound (component c) together with an additional component (d) comprising a compound of the chemical formula $$M-R_x$$

where M is an element of main group IV of the Periodic Table; R is halogen and x is an integer from 1–4.

2. A Ziegler catalyst as claimed in claim 1, wherein the radicals R in component (d) are identical and the element of main group IV of the Periodic Table present in component (d) is silicon or germanium.

3. A Ziegler catalyst as claimed in claim 1, wherein the radicals R in component (d) are not identical and the element of main group IV of the Periodic Table present in component (d) is silicon or germanium.

4. A Ziegler catalyst as claimed in claim 1, wherein component (a) is a magnesium alkoxide of the formula $Mg(OR^1)(OR^2)$, where $R^1$ and $R^2$ are identical or different and are each an alkyl radical having from 1 to 6 carbon atoms, in particular Mg(OCH$_3$)$_2$, Mg(OC$_2$H$_5$)$_2$, Mg(O—iC$_3$H$_7$)$_2$, Mg(O—nC$_4$H$_9$)$_2$, Mg(OCH$_3$)(OC$_2$H$_5$), Mg(OC$_2$H$_5$)(O—nC$_3$H$_7$), or a magnesium alkoxide of the formula Mg(OR)$_n$X$_m$, where X=halogen, (SO$_4$)$_{1/2}$, OH, (CO$_3$)$_{1/2}$, or (PO$_4$)$_{1/3}$, R is as defined above for R$^1$ or R$^2$ and n+m=2.

5. A Ziegler catalyst as claimed in claim 1, wherein the component (b) present is TiCl$_4$ or Ti(OR)$_4$ where R is an alkyl radical having 1 to 6 carbon atoms.

6. A Ziegler catalyst as claimed in claim 1, wherein the component (d) has a chemical composition in which the radical R is a chlorine or bromine atom.

7. A Ziegler catalyst as claimed in claim 1 wherein component (a) is Mg(OC$_2$H$_5$)$_2$, component (b) is TiCl$_4$, component (c) is Al$_2$(C$_2$H$_5$)$_3$Cl$_3$ and component (d) is SiCl$_4$.

8. A Ziegler catalyst for preparing 1-olefin homopolymers and copolymers by polymerization of a 1-olefin of the formula R$^4$CH=CH$_2$, where R$^4$ is hydrogen or an alkyl radical having from 1 to 10 carbon atoms, in suspension, in solution or in the gas phase, which catalyst consists of the reaction product of a magnesium alkoxide (component a) with a titanium compound (component b) and an organometallic compound (component c) together with an additional component (d) comprising a compound of the chemical formula

where M is an element of main group IV of-the Periodic Table; R is halogen, alkyl having from 1 to 10 carbon atoms, oxyalkyl having from 1 to 10 carbon atoms, cycloalkyl having from 4 to 8 carbon atoms in the ring and from 0 to 6 substituents R' on the ring, or aryl having from 6 to 10 carbon atoms in the aromatic and from 0 to 6 substituents R' on the aromatic, where R' is a halogen or an alkyl radical having from 1 to 4 carbon atoms or an OH group or an NO2 group or an oxyalkyl radical having from 1 to 4 carbon atoms; and x is an integer from 1–4.

9. A process for preparing a Ziegler catalyst as claimed in claim 1, which comprises reacting the magnesium alkoxide of the component (a) with the titanium compound of the component (b) at a temperature in the range from 20 to 100° C., in the presence of an inert hydrocarbon while stirring, with from 0.05 to 5 mol of component (b) being used per 1 mol of magnesium alkoxide, wherein component (d) is added.

10. The process as claimed in claim 9, wherein the component (d) is added at a temperature of from 20 to 120° C., in the presence of an inert hydrocarbon while stirring, with from 0.05 to 5 mol of component (d) being used per 1 mol of magnesium alkoxide.

11. The process as claimed in claim 9, wherein the reaction is from 0.5 to 8 hours.

12. The process as claimed in claim 9, wherein the reaction product of component (a), component (b) and component (d) is subsequently reacted with component (c), a chlorine-containing organoaluminum compound.

13. A process for preparing a Ziegler catalyst as claimed in claim 9, wherein the magnesium alkoxide of component (a) is reacted with the titanium compound of the component (b) at a temperature in the range from 60 to 90° C., with from 0.1 to 3.5 mol of component (b) per 1 mol of magnesium alkoxide; the component (d) is added at a temperature of from 60–100° C.; and the reaction is carried out from 2 to 6 hours.

14. A process for preparing 1-olefin homopolymers and copolymers by polymerization of a 1-olefin of the formula R$^4$CH=CH$_2$, where R$^4$ is hydrogen or an alkyl radical having from 1 to 10 carbon atoms, in suspension, in solution or in the gas phase in the presence of the catalyst as claimed in claim 1, where the catalyst is combined with a cocatalyst either in a stirred vessel at a temperature in the range from −30 to 150° C., prior to the polymerization or directly in the polymerization vessel at a temperature in the range from 20 to 200° C. and the polymerization is carried out in solution, in suspension or in the gas phase, continuously or batchwise, in one or more stages at a temperature in the range from 20 to 200° C., and a pressure in the range from 0.5 to 50 bar.

15. The process as claimed in claim 14, wherein the addition of the cocatalyst is carried out in two steps, with the catalyst being preactivated with a first part of cocatalyst at a temperature in the range from −30 to 150° C. prior to the polymerization reaction and the further addition of a further part of the same cocatalyst or another cocatalyst being carried out in the polymerization reactor at a temperature of from 20 to 200° C.

16. The process as claimed in claim 14, wherein the catalyst is introduced into the polymerization reaction in a prepolymerized state.

17. The process as claimed in claim 14, wherein ethylene, propylene, 1-butene, 1-hexene, 4-methyl-1-pentene or 1-octene, alone or in a mixture of at least 50% by weight of ethylene and not more than 50% by weight of another 1-olefin of the above formula, is polymerized and the molar mass of the polymer is regulated by means of hydrogen.

18. The process as claimed in claim 14 carried out in suspension or solution, wherein the catalyst is used in a concentration, based on transition metal, of from 0.0001 to 1 mmol, of transition metal per dm$^3$ of dispersion medium and the polymerization is carried out in an inert dispersion medium selected from the group consisting of aliphatic and cycloaliphatic hydrocarbons which have carefully been freed of oxygen, sulfur compounds and moisture.

19. The process as claimed in claim 18, wherein the catalyst is used in a concentration, based on transition metal of from 0.001 to 0.5 mmol of transition metal per dm$^3$ of dispersion medium and said inert dispersion medium selected from the group consisting of butane, pentane, hexane, heptane, isooctane, cyclohexane, methylcyclohexane, petroleum fractions and hydrogenated diesel oil fractions which have carefully been freed of oxygen, sulfur compounds and moisture.

20. A process for preparing 1-olefin homopolymers and copolymers as claimed in claim 14, wherein the catalyst is combined with the cocatalyst at a temperature in the range from −10 to 120° C. and the polymerization is carried out at a temperature in the range of 50 to 150° C. and a pressure in the range form 1.5 to 30 bar.

* * * * *